United States Patent Office 2,751,411
Patented June 19, 1956

2,751,411
N-BUTYL-3-PHENYLSALICYLAMIDES

Melville Sahyun and John A. Faust, Santa Barbara, Calif., assignors, by mesne assignments, to Cutter Laboratories, Inc., Berkeley, Calif., a corporation of California No Drawing. Application April 9, 1954,
Serial No. 422,245

4 Claims. (Cl. 260—559)

This invention relates to organic compounds and is more particularly concerned with N-butyl-3-phenylsalicylamides and a process whereby they may be prepared.

The compounds of the present invention have indicated utility as fungicidal agents on microbiological testing.

A satisfactory method for preparing the compounds of the present invention includes the aminolysis of lower-alkyl or aryl esters of 3-phenylsalicylic acid. This aminolysis may be readily accomplished by the contact interaction of an appropriate butylamine with an appropriate lower-alkyl or aryl 3-phenylsalicylate. Representative lower-alkyl esters which are suitable include, for example, the methyl, ethyl, propyl, isopropyl, butyl, pentyl, hexyl, et cetera, esters of 3-phenylsalicylic acid and representative aryl esters include, for example, phenyl, tolyl, cresyl, et cetera, 3-phenylsalicylates. Contact of the reactants is usually sufficient to cause reaction, however, at lower temperatures, such as room temperature, or lower, a substantially complete reaction takes an unduly long period of time. Therefore, it is preferred that the reaction temperature be at about the reflux temperature of the reaction mixture. When reflux temperatures are employed, less than ten hours will usually afford a substantially complete reaction. Thereafter, the reaction product may be separated in conventional manner, as by alkalinizing the reaction mixture and agitating until a product separates. By recrystallization of the product in a manner known to those skilled in the art, a relatively pure solid, N-butyl-3-phenyl-salicylamide, may be prepared.

The following examples are given to illustrate specific procedures whereby the compounds of the present invention may be prepared, however, said examples are not to be construed as limiting the invention thereto.

Example 1.—N-(n-butyl)-3-phenylsalicylamide

A mixture of 22.8 grams (0.1 mole) of methyl 3-phenyl-salicylate and 14.6 grams (0.2 mole) of n-butylamine was refluxed for seven hours, diluted with water, and sufficient material distilled off in order that the residual water was neutral. The residual mixture was cooled, made basic with sodium bicarbonate, and vigorously agitated until an oily product solidified. By recrystallizing the crude oily product which solidified from dilute methanol, a pure N - (n - butyl) - 3 - phenylsalicylamide, as colorless needles melting at 70–72 degrees centigrade, and weighing 19.7 grams (73 percent of the theoretical yield) was obtained.

Analysis:
  Calculated_____ N, 5.20
  Found_____    5.26

Example 2.—N-(isobutyl)-3-phenylsalicylamide

A mixture of 29.0 grams (0.1 mole) of phenyl 3-phenyl-salicylate and 14.6 grams (0.2 mole) of isobutylamine was heated in an oil bath at 150–160 degrees centigrade for five hours, then steam distilled to remove phenol and excess amine. The residue was extracted with ether, the ether solution was washed successively with water, dilute hydrochloric acid, and water, after which it was dried. After the ether was distilled off, the liquid residue was dissolved in hot heptane and the solution was treated with charcoal. On cooling, yellowish needles melting at 76–78 degrees centigrade separated. A colorless crystalline product, N-(isobutyl)-3-phenylsalicylamide, melting at 77–79 degrees centigrade and weighing 19.2 grams (71 percent of the theoretical yield) was obtained by recrystallizing the crude material from dilute methanol.

Analysis:
  Calculated_____ N, 5.20
  Found_____    5.14

In a manner similar to the foregoing examples, a secondary butylamine may be reacted with a suitable lower-alkyl or aryl ester of 3-phenylsalicylic acid to prepare N-(secondary-butyl)-3-phenylsalicylamide, and tertiary-butyl-amine may be reacted with a suitable lower-alkyl or aryl ester of 3-phenylsalicylic acid to prepare N-(tertiarybutyl)-3-phenylsalicylamide.

This application is a continuation-in-part of our prior filed application Serial 292,581, filed June 9, 1952, now abandoned.

Various modifications may be made in the present invention without departing from the spirit or scope thereof and it is to be understood that we limit ourselves only as defined in the appended claims.

We claim:
1. N-(butyl)-3-phenylsalicylamide.
2. A compound selected from the group consisting of N-(n-butyl)-3-phenylsalicylamide and N-(isobutyl)-3-phenylsalicylamide.
3. N-(n-butyl)-3-phenylsalicylamide.
4. N-(isobutyl)-3-phenylsalicylamide.

References Cited in the file of this patent

UNITED STATES PATENTS 2,190,829   Graves _____ Feb. 20, 1940

FOREIGN PATENTS 276,621   Switzerland _____ Oct. 16, 1951

OTHER REFERENCES

Van Allan: "J. Am. Chem. Soc.," vol. 69 (1947), pp. 2913–4.

Way et al. "J. Pharmacol. Exptl. Therap.," vol. 108, August 1953 (received February 27, 1953), pp. 450–460.